US012559642B2

(12) United States Patent
Syu et al.

(10) Patent No.:  US 12,559,642 B2
(45) Date of Patent:  *\*Feb. 24, 2026**

(54) PRIMER COMPOSITION FOR SURFACE-PRINTED FLEXIBLE PACKAGING, INK SET, SURFACE-PRINTED MATTER, AND INKJET PRINTING METHOD

(71) Applicant: SAKATA INX CORPORATION, Osaka (JP)

(72) Inventors: Saiei Syu, Osaka (JP); Kazuki Moriyasu, Osaka (JP); Hirohito Maeda, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 150 days.

This patent is subject to a terminal disclaimer.

(21) Appl. No.: 18/284,456

(22) PCT Filed: Apr. 25, 2022

(86) PCT No.: PCT/JP2022/018757
§ 371 (c)(1),
(2) Date: Aug. 9, 2024

(87) PCT Pub. No.: WO2023/276427
PCT Pub. Date: Jan. 5, 2023

(65) Prior Publication Data
US 2025/0270414 A1  Aug. 28, 2025

(30) Foreign Application Priority Data
Jun. 30, 2021  (JP) ................................. 2021-109035

(51) Int. Cl.
| | |
|---|---|
| *B32B 3/16* | (2006.01) |
| *B41M 5/00* | (2006.01) |
| *C09D 11/023* | (2014.01) |
| *C09D 11/107* | (2014.01) |
| *C09D 11/108* | (2014.01) |
| *C09D 11/12* | (2006.01) |
| *C09D 11/40* | (2014.01) |
| *C09D 11/54* | (2014.01) |

(52) U.S. Cl.
CPC ................ *C09D 11/54* (2013.01); *B32B 3/16* (2013.01); *B41M 5/0017* (2013.01); *B41M 5/0047* (2013.01); *B41M 5/0064* (2013.01); *C09D 11/023* (2013.01); *C09D 11/107* (2013.01); *C09D 11/108* (2013.01); *C09D 11/12* (2013.01); *C09D 11/40* (2013.01)

(58) Field of Classification Search
CPC .......... B32B 3/16; B32B 27/00; B32B 27/20; C09D 11/54; C09D 11/12; C09D 11/322; C09D 11/023
See application file for complete search history.

(56) References Cited

U.S. PATENT DOCUMENTS

| | | | |
|---|---|---|---|
| 6,498,203 B1 | 12/2002 | Kito et al. | |
| 2006/0046056 A1 | 3/2006 | Brown et al. | |
| 2015/0072091 A1 | 3/2015 | Gantillion et al. | |
| 2017/0176881 A1 | 6/2017 | Okamoto et al. | |
| 2017/0283735 A1 | 10/2017 | Feng et al. | |
| 2019/0161633 A1 | 5/2019 | Sato et al. | |
| 2019/0282989 A1 | 9/2019 | Feng et al. | |
| 2020/0362191 A1 | 11/2020 | Sandoval et al. | |
| 2021/0348011 A1* | 11/2021 | Sato ..................... B41M 5/0064 |
| 2022/0056294 A1 | 2/2022 | Sato et al. | |
| 2024/0158653 A1* | 5/2024 | Syu ....................... C09D 11/023 |
| 2024/0218199 A1* | 7/2024 | Maeda ................. C09D 11/324 |

FOREIGN PATENT DOCUMENTS

| | | |
|---|---|---|
| CN | 1256294 A | 6/2000 |
| CN | 1743343 A | 3/2006 |
| CN | 101094899 A | 12/2007 |
| CN | 101275005 A | 10/2008 |
| CN | 104271692 A | 1/2015 |
| CN | 105940350 A | 9/2016 |
| CN | 107673620 A | 2/2018 |

(Continued)

OTHER PUBLICATIONS

International Search Report issued for PCT/JP2022/018757, dated Jul. 19, 2022.
Written Opinion of the International Searching Authority issued for PCT/JP2022/018757, dated Jul. 19, 2022.
International Preliminary Report on Patentability issued for PCT/JP2022/018757, dated Jan. 11, 2024, with English translation.
Extended European Search Report issued for related EP patent application Serial No. 22832587.4, dated May 22, 2025.
Written Opinion of the International Searching Authority issued for PCT/JP2022/018757, dated Jul. 19, 2022 with English Translation.
Office Action issued for related CN patent application Serial No. 202280017292.2, dated Jul. 25, 2025, with English translation.
Chinese Notification of Grant of Invention Patent Right dated Oct. 27, 2025, with English translation.

*Primary Examiner* — Elizabeth E Mulvaney
(74) *Attorney, Agent, or Firm* — Westman, Champlin & Koehler, P.A.; Z. Peter Sawicki

(57) ABSTRACT

It is an object of the present invention to provide a primer composition for surface-printed flexible packaging, an ink set, a surface-printed matter, and an inkjet printing method, which can impart excellent solid uniformity, bleeding resistance, abrasion resistance, alcohol resistance, and heat resistance to a coating film when an inkjet image is formed after applying the primer composition. Provided is a primer composition for surface-printed flexible packaging comprising an acryl-based resin emulsion emulsified with a polymer, N-oleoyl sarcosine, a hydrazine-based compound having at least two or more hydrazine residues in a molecule, and wax, wherein a content of the acryl-based resin emulsion is 3 to 40% by mass in terms of solid content, and wherein a glass transition temperature of the acryl-based resin emulsion is-40 to 30° C.

6 Claims, No Drawings

(56) References Cited

FOREIGN PATENT DOCUMENTS

| | | | |
|---|---|---|---|
| CN | 108699370 | A | 10/2018 |
| CN | 109504171 | A | 3/2019 |
| EP | 2003177 | A1 | 12/2008 |
| EP | 3730560 | A1 | 10/2020 |
| JP | H11-129613 | A | 5/1999 |
| JP | H11-140365 | A | 5/1999 |
| JP | 2001-234093 | A | 8/2001 |
| JP | 2008-285563 | A | 11/2008 |
| JP | 2010-202706 | A | 9/2010 |
| JP | 2014-024944 | A | 2/2014 |
| JP | 2016-155340 | A | 9/2016 |
| JP | 2017-190416 | A | 10/2017 |
| JP | 2017201000 | A | 11/2017 |
| JP | 2018-012219 | A | 1/2018 |
| JP | 2020-59822 | A | 4/2020 |
| WO | 2013/153337 | A1 | 10/2013 |
| WO | 2018016141 | A1 | 1/2018 |
| WO | 2018/225701 | A1 | 12/2018 |
| WO | 2020213220 | A1 | 10/2020 |

* cited by examiner

PRIMER COMPOSITION FOR SURFACE-PRINTED FLEXIBLE PACKAGING, INK SET, SURFACE-PRINTED MATTER, AND INKJET PRINTING METHOD

CROSS-REFERENCE TO RELATED APPLICATION

This Application is a Section 371 National Stage Application of International Application No. PCT/JP2022/018757, filed Apr. 25, 2022 and published as WO2023/276427 on Jan. 5, 2023, in Japanese, which claims priority to JP patent application Serial No. 2021-109035, filed Jun. 30, 2021, the contents of which are hereby incorporated by reference in their entirety.

TECHNICAL FIELD

The present invention relates to a primer composition for surface-printed flexible packaging, an ink set, a surface-printed matter, and an inkjet printing method. More specifically, the present invention relates to a primer composition for surface-printed flexible packaging, an ink set, a surface-printed matter, and an inkjet printing method, which can impart excellent solid uniformity, bleeding resistance, abrasion resistance, alcohol resistance, and heat resistance to a coating film when an inkjet image is provided after applying the primer composition.

BACKGROUND ART

Conventionally, flexible packaging materials using various plastic films have been used for food, confectionery, household goods, pet food, and the like, from the viewpoints of design, economy, content protection, transportability, and the like. Moreover, many flexible packaging materials are subjected to gravure printing or flexographic printing. Surface printing is applied to a surface of a base film of a flexible packaging material. A primer ink is applied to the film surface so that the ink is easily received by the base material and a clear design or the like is printed thereon. Therefore, a primer composition used for surface printing on a flexible packaging material has been developed (for example, Patent Document 1).

PRIOR ART DOCUMENT

Patent Document

Patent Document 1: JP 2014-24944 A

SUMMARY OF THE INVENTION

The primer composition described in Patent Document 1 has room for improvement in heat resistance of a coating film obtained when an inkjet image is provided after applying the primer composition. Moreover, the primer composition described in Patent Document 1 also has room for improvement in terms of water resistance of a coating film of an inkjet image obtained and alcohol resistance.

The present invention has been made in view of such conventional problems, and it is an object of the present invention to provide a primer composition for surface-printed flexible packaging, an ink set, a surface-printed matter, and an inkjet printing method, which can impart excellent solid uniformity, bleeding resistance, abrasion resistance, alcohol resistance, and heat resistance to a coating film when an inkjet image is formed after applying the primer composition.

As a result of intensive studies for solving the above-described problems, the present inventors have found that heat resistance in the formed coating film of the inkjet image is greatly improved by compounding N-oleoyl sarcosine that has been conventionally used as a antirust agent in the primer composition. In addition, the present inventors have found that the above-described problems can be solved as well by compounding an acryl-based resin emulsion emulsified with a polymer, which exhibits a specific amount and a specific glass transition temperature, a hydrazine-based compound having a specific structure, and wax, and completed the present invention.

The primer composition for surface-printed flexible packaging according to one aspect of the present invention for solving the above-described problems comprises an acryl-based resin emulsion emulsified with a polymer, N-oleoyl sarcosine, a hydrazine-based compound having at least two or more hydrazine residues in a molecule, and wax, wherein a content of the acryl-based resin emulsion is 3 to 40% by mass in terms of solid content, and wherein a glass transition temperature of the acryl-based resin emulsion is −40 to 30° C.

EMBODIMENT FOR CARRYING OUT THE INVENTION

\<Primer Composition for Surface-Printed Flexible Packaging\>

The primer composition for surface-printed flexible packaging according to one aspect of the present invention for solving the above-described problems (hereinafter also referred to as the primer composition) comprises an acryl-based resin emulsion emulsified with a polymer, N-oleoyl sarcosine, a hydrazine-based compound having at least two or more hydrazine residues in a molecule, and wax. A content of the acryl-based resin emulsion is 3 to 40% by mass in terms of solid content. A glass transition temperature of the acryl-based resin emulsion is −40 to 30° C. Each component will be described below.

(Acryl-Based Resin Emulsion Emulsified with Polymer)

The acryl-based resin emulsion of the present embodiment is an acryl-based resin emulsion emulsified with a polymer compound. Moreover, a glass transition temperature of the acryl-based resin emulsion is −40 to 30° C. The acryl-based resin emulsion emulsified with a polymer may take a core-shell structure consisting of a shell that is a polymer functioning as a polymer emulsifier and a core that consists of a resin that is more hydrophobic than the shell. Besides, the acryl-based resin emulsion emulsified with a polymer of the present embodiment is distinguished from an acryl-based resin emulsion emulsified with an emulsifier such as a surfactant, which is a low molecular weight compound.

The acryl-based resin emulsion emulsified with a polymer is not particularly limited. By way of an example, the acryl-based resin emulsion emulsified with a polymer is an acrylic resin emulsion, a styrene-acryl-based resin emulsion, an acryl-vinyl acetate-based resin emulsion, an acryl-vinyl chloride-based resin emulsion, an acryl-silicone-based resin emulsion, an acryl-colloidal silica-based resin emulsion, or the like. Among them, the acryl-based resin emulsion emulsified with a polymer is preferably an acrylic resin emulsion (i.e., an "acrylic resin emulsion", not an "acryl"-based" resin emulsion of mixed system") because it is excellent in transparency and coating film resistance.

A glass transition temperature (Tg) of the acryl-based resin emulsion emulsified with a polymer may be −40° C. or higher, preferably −20° C. or higher. Moreover, the glass transition temperature (Tg) of the acryl-based resin emulsion emulsified with a polymer may be 30° C. or lower, preferably 20° C. or lower. When the Tg is less than −40° C., the primer composition has a problem that blocking resistance deteriorates. On the other hand, when the Tg exceeds 30° C., the primer composition has a problem that adhesiveness to a film is lowered, deteriorating coating film resistance. Besides, a glass transition temperature of resin in the present embodiment is a theoretical glass transition temperature as calculated by the following Wood's equation, when the resin is an acryl-based copolymer resin.

Wood's equation: $1/Tg = W1/Tg1 + W2/Tg2 + W3/Tg3 + \ldots + Wx/Tgx$

[wherein, Tg1 to Tgx represent respective glass transition temperatures of homopolymers of the monomers 1, 2, 3 . . . x each constituting resin, W1 to Wx represent respective polymerization fractions of 1, 2, 3 . . . x, and Tg represents a theoretical glass transition temperature. However, the glass transition temperature in Wood's equation is an absolute temperature.]

An acid value of the acryl-based resin emulsion emulsified with a polymer is preferably 10 mgKOH/g or more, and more preferably 40 mgKOH/g or more. Moreover, the acid value is preferably 100 mgKOH/g or less, and more preferably 80 mgKOH/g or less. When the acid value is within the above-described ranges, the primer composition has an advantage that solubility in water does not become too high, improving abrasion resistance and alcohol resistance of a coating film. Besides, in the present embodiment, the acid value of the acryl-based resin emulsion is a theoretical acid value obtained by arithmetically calculating the number of mg of potassium hydroxide which is theoretically required for neutralizing 1 g of the acryl-based resin emulsion, based on composition of a monomer used for synthesizing the acryl-based resin emulsion.

A content of the acryl-based resin emulsion emulsified with a polymer may be 3% by mass or more, preferably 10% by mass or more, in terms of solid content, in the primer composition. Moreover, the content of the acryl-based resin emulsion emulsified with a polymer may be 40% by mass or less, preferably 25% by mass or less, in terms of solid content, in the primer composition. When the content of the acryl-based resin emulsion emulsified with a polymer is less than 3% by mass, the primer composition has a poor alcohol resistance of a coating film obtained when an inkjet image is formed after applying the primer composition. On the other hand, when the content of the acryl-based resin emulsion emulsified with a polymer exceeds 40% by mass, the primer composition has a problem that storage stability deteriorates.

(N-Oleoyl Sarcosine)

N-oleoyl sarcosine is compounded for imparting heat resistance to the primer composition. In this way, the primer composition of the present embodiment is characterized in that N-oleoyl sarcosine, which has been conventionally used as an antirust agent, may further impart heat resistance, without deteriorating various characteristics, to a coating film obtained, when forming an inkjet image after applying the primer composition, for applications of the primer composition for surface-printed flexible packaging.

A content of N-oleoyl sarcosine is not particularly limited. By way of an example, the content of N-oleoyl sarcosine is preferably 0.05% by mass or more, and more preferably 0.1% by mass or more, in the primer composition. Moreover, the content of N-oleoyl sarcosine is preferably 6% by mass or less, and more preferably 2% by mass or less, in the primer composition. When the content of the N-oleoyl sarcosine is within the above-described ranges, the primer composition has an excellent heat resistance of a coating film obtained when an inkjet image is formed after applying the primer composition. In addition, the primer composition has an excellent storage stability.

(Hydrazine-Based Compound Having at Least Two or More Hydrazine Residues in Molecule)

The hydrazine-based compound having at least two or more hydrazine residues in a molecule is compounded for imparting alcohol resistance to the primer composition.

The hydrazine compound has two or more hydrazine residues and is preferably a water-soluble polyhydrazine or hydrazide compound. Moreover, the hydrazine compound is preferably hydrazine, alkylenedihydrazine represented by the following general formula (1), a dihydrazide compound of a saturated aliphatic dibasic acid or unsaturated dibasic acid, or the like.

$$H_2N-NH-X-NH-NH_2 \qquad (1)$$

(wherein X represents an alkylene group having 1 to 8 carbon atoms or a residue of a saturated or unsaturated dibasic acid having 1 to 10 carbon atoms).

Alkylene dihydrazine is methylene dihydrazine, ethylene dihydrazine, propylene dihydrazine, butylene dihydrazine, or the like. The dihydrazide compound of a saturated aliphatic dibasic acid is oxalic acid dihydrazide, malonic acid dihydrazide, succinic acid dihydrazide, glutaric acid dihydrazide, adipic acid dihydrazide, sebacic acid dihydrazide, or the like. The dihydrazide compound of an unsaturated dibasic acid is dihydrazide phthalate, dihydrazide fumarate, dihydrazide itaconate, or the like.

A content of the hydrazine-based compound having at least two or more hydrazine residues in a molecule is not particularly limited. By way of an example, the content of the hydrazine-based compound having at least two or more hydrazine residues in a molecule is preferably 0.05% by mass or more, and more preferably 0.1% by mass or more, in the primer composition. Moreover, the hydrazine-based compound having at least two or more hydrazine residues in a molecule is preferably 6% by mass or less, and more preferably 3% by mass or less, in the primer composition. When the content of the hydrazine-based compound having at least two or more hydrazine residues in a molecule is within the above-described ranges, the primer composition has an excellent alcohol resistance of a coating film obtained when an inkjet image is formed after applying the primer composition. In addition, the primer composition has an excellent storage stability.

(Wax)

Wax is compounded for improving abrasion resistance. Wax is not particularly limited. By way of an example, wax includes animal and plant waxes such as beeswax, lanolin wax, spermaceti, candelilla wax, carnauba wax, rice wax, Japan wax, and jojoba oil; minerals such as montan wax, ozokerite, ceresin, paraffin wax, microcrystalline wax, and petrolatum; synthetic hydrocarbon waxes such as petroleum-based wax, Fischer-Tropsch wax, polyethylene wax, polyethylene oxide wax, and polypropylene oxide wax; fluororesin-based waxes such as polytetrafluoroethylene wax; modified waxes such as a mixture of polytetrafluoroethylene wax and polyethylene wax, a montan wax derivative, a paraffin wax derivative, and a microcrystalline wax derivative; hydrogenated waxes such as hydrogenated castor oil and a hydrogenated castor oil derivative; polytetrafluoroethylene wax; and the like. Among then, wax is preferably polyethylene wax, a mixture of polytetrafluoroethylene wax and polyethylene wax, fluororesin-based wax, Fischer-Tropsch wax, or the like.

An average particle size of wax is not particularly limited. By way of an example, the average particle size of wax is preferably 0.05 μm or more, and more preferably 0.1 μm or more. Moreover, the average particle size of wax is preferably 6 μm or less, and more preferably 5 μm or less. The primer composition of the present embodiment may improve in blocking resistance of a coating film obtained, by compounding a wax having a relatively large particle size, when an inkjet image is formed after applying the primer composition. Besides, in the present embodiment, the average particle size of wax may be measured with Nanotrac (UPA-EX150, manufactured by Nikkiso Co., Ltd.).

A content of wax is not particularly limited. By way of an example, the content of wax is preferably 0.05% by mass or more, and more preferably 0.1% by mass or more, in terms of solid content, in the primer composition. Moreover, the content of the wax is preferably 12% by mass or less, and more preferably 4% by mass or less, in terms of solid content, in the primer composition. When the content of the wax is within the above-described ranges, the primer composition has an excellent blocking resistance of a coating film obtained when an inkjet image is formed after applying the primer composition.

(White Pigment)

The primer composition of the present embodiment appropriately comprises a white pigment. When the primer composition comprises a white pigment, the printed matter with the primer composition is further excellent in design and visibility.

A white pigment is not particularly limited. By way of an example, the white pigment is a variety of inorganic white pigments, organic white pigments, or the like. The inorganic white pigment is titanium oxide, zinc oxide, cerium oxide, silica, alumina, magnesium oxide, zirconium dioxide, yttria-stabilized zirconium, indium oxide, antimony oxide, tin oxide, barium titanate, barium sulfate, calcium carbonate, fine-powdered silicic acid, calcium silicate, talc, clay, or the like. The organic white pigment is an organic compound salt disclosed in JP H11-129613 A, an alkylenebismelamine derivative disclosed in JP H11-140365 A and JP 2001-234093 A, or the like. Among them, the white pigment is preferably a variety of titanium oxide such as a rutile type and an anatase type, and more preferably titanium oxide whose surface is coated with alumina, silica, organic matter, or the like, from the viewpoint of its excellent concealment.

An average particle size of the white pigment is not particularly limited. By way of an example, the average particle size of the white pigment is preferably 100 nm or more, and more preferably 150 nm or more. Moreover, the average particle size of the white pigment is preferably 500 nm or less, and more preferably 400 nm or less. When the average particle size of the white pigment is within the above-described ranges, the primer composition has an excellent concealment of a coating film obtained when an inkjet image is formed after applying the primer composition. Besides, in the present embodiment, the average particle size is a volume average particle size measured by a laser diffraction particle size measurement method using Nanotrac (UPA-EX150, manufactured by Nikkiso Co., Ltd.).

A content of the white pigment is not particularly limited. By way of an example, the content of the white pigment is preferably 5% by mass or more, and more preferably 10% by mass or more, in the primer composition. Moreover, the content of the white pigment is preferably 20% by mass or less, and more preferably 15% by mass or less, in the primer composition. When the content of the white pigment is within the above-described ranges, the primer composition has an excellent concealment of a coating film obtained when an inkjet image is formed after applying the primer composition. In addition, when the primer composition is applied to a flexible packaging material and then a design such as an industrial design is printed thereon, the design, or the like is easily visible.

(Chlorinated Polyolefin)

The primer composition of the present embodiment preferably further comprises a chlorinated polyolefin. The chlorinated polyolefin is preferably used in a form of a chlorinated polyolefin emulsion. The chlorinated polyolefin emulsion is obtained by chlorinating and emulsifying a polyolefin resin.

The chlorinated polyolefin is not particularly limited. By way of an example, examples of the chlorinated polyolefin include a chlorinated polypropylene resin, a chlorinated polyethylene resin, and the like. Moreover, the chlorinated polyolefin may be a modified product. The modified product is not particularly limited. By way of an example, the modified product of chlorinated polyolefin includes those obtained by graft-polymerizing a chlorinated polyolefin with a polymerizable acrylic compound (acrylic acid, methacrylic acid, or alkyl ester thereof, etc.) or an unsaturated polycarboxylic acid (maleic acid, maleic anhydride, itaconic acid, itaconic anhydride, etc.), or those obtained by chlorinating the above-described polyolefin graft-polymerized with the unsaturated polycarboxylic acid, etc.

A chlorine content in the chlorinated polyolefin is not particularly limited. By way of an example, the chlorine content is preferably 1% by mass or more, and more preferably 10% by mass or more, based on the entire resin. Moreover, the chlorine content is preferably 40% by mass or less, and more preferably 30% by mass or less, based on the entire resin. When the chlorine content is within the above-described ranges, the chlorinated polyolefin is easily dissolved in a solvent and has an excellent adhesiveness between the base material and the primer composition.

When the ink composition comprises a chlorinated polyolefin, a content of the chlorinated polyolefin is not particularly limited. By way of an example, the content of the chlorinated polyolefin is preferably 0.5% by mass or more, and more preferably 1% by mass or more, in terms of solid content, in the primer composition. Moreover, the content of the chlorinated polyolefin is preferably 5% by mass or less, and more preferably 2% by mass or less, in terms of solid content, in the primer composition. When the content of the chlorinated polyolefin is within the above-described ranges, the primer composition has a further excellent solid uniformity of a coating film obtained when an inkjet image is formed after applying the primer composition.

(Water-Soluble Organic Solvent)

The primer composition of the present embodiment preferably further comprises a water-soluble organic solvent. When the primer composition comprises a water-soluble organic solvent, the primer composition has a further excellent solid uniformity of a coating film obtained when an inkjet image is formed after applying the primer composition.

The water-soluble organic solvent is not particularly limited. By way of an example, the water-soluble organic solvent preferably includes an alcohol and a polyhydric alcohol-based solvent, and more preferably includes methanol, ethanol, propanol, butanol, hexanol, ethylene glycol, ethylene glycol monomethyl ether, ethylene glycol monoethyl ether, ethylene glycol monopropyl ether, ethylene glycol monobutyl ether, ethylene glycol monooctyl ether, diethylene glycol, diethylene glycol monoethyl ether, diethylene glycol monopropyl ether, diethylene glycol monobutyl ether, triethylene glycol, triethylene glycol monomethyl ether, triethylene glycol monoethyl ether, triethylene glycol monopropyl ether, triethylene glycol monobutyl ether, propylene glycol, propylene glycol monoethyl ether, propylene glycol monopropyl ether, propylene glycol monobutyl ether, dipropylene glycol, dipropylene glycol monomethyl ether, dipropylene glycol monoethyl ether, dipropylene glycol monopropyl ether, dipropylene glycol monobutyl ether, dipropylene glycol dimethyl ether, tripropylene glycol, tripropylene glycol monomethyl ether, tripropylene glycol monoethyl ether, tripropylene glycol monopropyl ether, tripropylene glycol monobutyl ether, 3-methoxy-3-methyl-1-butanol, dibutyl glycol, glycerin, and the like.

When the ink composition comprises a water-soluble organic solvent, a content of the water-soluble organic solvent is not particularly limited. By way of an example, the content of the water-soluble organic solvent is preferably 0.1% by mass or more, and more preferably 0.5% by mass or more, in the primer composition. Moreover, the content of the water-soluble organic solvent is preferably 20% by mass or less, and more preferably 10% by mass or less, in the primer composition. When the content of the water-soluble organic solvent is within the above-described ranges, the primer composition has a further excellent solid uniformity of a coating film obtained when an inkjet image is formed after applying the primer composition.

(Optional Components)

Various additives such as a tackifier, a cross-linking agent, a lubricant, an anti-blocking agent, an antistatic agent, a surfactant, a chelating agent, and a hard resin may be appropriately compounded in the primer composition of the present embodiment.

(Method of Producing Primer Composition)

A method of producing the primer composition of the present embodiment is not particularly limited. By way of an example, the primer composition may be prepared by a method of stirring and mixing a white pigment, an acryl-based resin emulsion emulsified with a polymer, N-oleoyl sarcosine, a hydrazine-based compound having at least two or more hydrazine residues in a molecule, wax, and various optional components, and then kneading the mixture utilizing a variety of kneaders such as, for example, a bead mill, a ball mill, a sand mill, an attritor, a roll mill, and a pearl mill.

The obtained primer composition preferably has a viscosity of 10 to 1000 mPa·s. Moreover, when the primer composition is used for gravure printing, it is preferably diluted with water or an organic solvent so as to have an appropriate viscosity according to a printing condition, specifically so as to have a flow-out second of 12 to 23 sec/25° C. with a Zahn cup No. 3, or about 14 to 16 sec/25° C. for a high-speed printing, at an atmospheric temperature during printing.

The obtained primer composition may be printed as a primer composition for surface-printed flexible packaging on an adherend such as various plastic films for flexible packaging by, for example, a gravure printing method or the like. Examples of the plastic films include oriented and non-oriented polyolefins such as polyethylene and polypropylene, polyester, nylon, cellophane, vinylon, and the like, in terms that they can be printed integrally with packaging materials. The obtained printed matter may be made into a bag and utilized as a packaging container for foods, etc.

As described above, according to the present embodiment, the primer composition has an excellent storage stability, and may impart excellent solid uniformity, bleeding resistance, abrasion resistance, alcohol resistance, and heat resistance to the coating film when an inkjet image is formed after applying the primer composition.

<Ink Set>

The ink set according to one embodiment of the present invention includes the above-described primer composition for surface-printed flexible packaging and an aqueous inkjet ink composition. The aqueous inkjet ink composition comprises a pigment, a water-insoluble resin, and wax. Each component will be described below.

(Aqueous Inkjet Ink Composition)

The aqueous inkjet ink composition (hereinafter also referred to as the ink composition) comprises a pigment, a water-insoluble resin, and wax.

Pigment

The pigment is not particularly limited. By way of an example, examples of the pigment include various organic pigments and inorganic pigments. The organic pigments include dye lake pigments, azo-based pigments, benzimidazolone-based pigments, phthalocyanine-based pigments, quinacridone-based pigments, anthraquinone-based pigments, dioxazine-based pigments, indigo-based pigments, thioindigo-based pigments, perylene-based pigments, perinone-based pigments, diketo-pyrrolo-pyrrole-based pigments, isoindolinone-based pigments, nitro-based pigments, nitroso-based pigments, flavanthrone-based pigments, quinophthalone-based pigments, pyranthrone-based pigments, or indanthrone-based pigments, and the like.

The inorganic pigments include carbon black, titanium oxide, zinc white, red oxide, graphite, iron black, chromium oxide green, aluminum hydroxide, and the like.

The pigment may be surface-treated with a known surface treatment agent.

A yellow pigment is C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, or the like.

A magenta pigment is C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, or the like.

A cyan pigment is C. I. Pigment Blue 1, 2, 3, 15, 15:1, 15:2, 15:3, 15:4, 15:6, 16, 18, 22, 27, 29, 60, or the like.

A black pigment is carbon black (C. I. Pigment Black 7) or the like.

The white pigment is titanium oxide, aluminum oxide, or the like. The white pigment may be surface-treated with various materials such as alumina and silica.

A content of the pigment is not particularly limited. By way of an example, the content of the pigment is preferably 2% by mass or more, and more preferably 4% by mass or more, in the ink composition. Moreover, the content of the pigment is preferably 10% by mass or less, and more preferably 8% by mass or less, in the ink composition.

Water-Insoluble Resin

The water-insoluble resin is not particularly limited. By way of an example, the water-insoluble resin is an acryl-based emulsion or the like obtained by emulsion polymerization of a carboxyl group-containing monomer and another monomer by a known method.

Examples of the carboxyl group-containing monomers include acrylic acid, methacrylic acid, a maleic acid monoester compound having an aliphatic hydrocarbon group with 8 to 13 carbon atoms such as (anhydrous) maleic acid, monomethyl maleate, monoethyl maleate, monobutyl maleate, monohexyl maleate, monooctyl maleate, mono-2-ethylhexyl maleate, and monolauryl maleate, a maleic acid monoester compound having an aliphatic hydrocarbon group with 14 to 20 carbon atoms such as monomyristyl maleate, monocetyl maleate, monostearyl maleate, monooleyl maleate, and monoeicosyl maleate, crotonic acid and its ester compound, itaconic acid and its ester compound, and the like.

Examples of other radically polymerizable unsaturated monomers include a (meth)acrylic acid ester having an aliphatic hydrocarbon group such as methyl (meth)acrylate, ethyl (meth)acrylate, propyl (meth)acrylate, butyl (meth) acrylate, hexyl (meth)acrylate, 2-ethylhexyl (meth)acrylate, lauryl (meth)acrylate, myristyl (meth)acrylate, cetyl (meth) acrylate, stearyl (meth)acrylate, oleyl (meth)acrylate, and eicosyl (meth)acrylate, a (meth)acrylic acid ester compound having a hydroxyalkyl group such as 2-hydroxyethyl (meth) acrylate, 2-hydroxypropyl (meth)acrylate, and 3-hydroxypropyl (meth)acrylate, (meth)acrylamide, acrylonitrile, an olefin-based compound, etc., a styrene-based monomer such as styrene, α-methylstyrene, vinyltoluene, dimethylstyrene, ethylstyrene, isopropylstyrene, t-butylstyrene, chlorostyrene, dichlorostyrene, bromostyrene, and fluorostyrene, a benzyl (meth)acrylate-based monomer such as benzyl methacrylate and benzyl acrylate, a phenyl (meth)acrylate-based monomer such as phenyl methacrylate and phenyl acrylate, and the like.

A glass transition temperature of the water-insoluble resin is not particularly limited. By way of an example, the glass transition temperature is 50 to 120° C. When the glass transition temperature is within the above-described range, the obtained coating film has an excellent resistance and the ink composition has excellent storage stability and ejection stability.

A content of the water-insoluble resin is not particularly limited. By way of an example, the content of the water-insoluble resin is preferably 150% by mass or more, and more preferably 200% by mass or more, in terms of solid content, based on 100% by mass of the pigment. Moreover, the content of the water-insoluble resin is preferably 400% by mass or less, and more preferably 300% by mass or less, in terms of solid content, based on 100% by mass of the pigment. When the content of the water-insoluble resin is within the above-described ranges, the ink composition has excellent storage stability and ejection stability.

Wax

Wax is the same as described above in connection with the primer composition.

(Optional Components)

In the ink composition of the present embodiment, various additives such as a water-soluble resin, a surfactant, a water-soluble organic solvent, an extender pigment such as calcium carbonate, kaolin, barium sulfate, aluminum hydroxide, clay, and talc, an inorganic fine particle and an adhesive resin (an acrylic resin, a vinyl acetate resin) for imparting skid-proof capacity, a leveling agent for improving leveling property, an anti-foaming agent for imparting anti-foaming property, a basic compound such as caustic soda for imparting resolubility, a film-forming emulsion, a preservative, an antirust agent, and a cross-linking agent may be appropriately compounded.

Water-Soluble Resin

The water-soluble resin is not particularly limited. By way of an example, examples of the water-soluble resin include various alkali-soluble resins. The alkali-soluble resin is not particularly limited. By way of an example, examples of the alkali-soluble resin include a resin obtained by polymerizing a monomer having an unsaturated double bond, a resin obtained by reaction between functional groups, and the like.

Specifically, examples of the alkali-soluble resin include various binder resins such as an acryl-based resin obtained by copolymerizing acrylic acid or methacrylic acid and an alkyl ester thereof or styrene as main monomer components, a styrene-acryl-based resin, a styrene-maleic acid-based resin, a styrene-acryl-maleic acid-based resin, a polyurethane-based resin, a polyester-based resin, and the like.

These alkali-soluble resins may be dissolved in water in the presence of a basic compound and used as a water-soluble resin varnish. The basic compound is not particularly limited. By way of an example, examples of the basic compound include ammonia, an organic amine, an alkali metal hydroxide, and the like. Examples of the organic amine include alkylamine such as diethylamine, triethylamine, and ethylenediamine, alkanolamine such as monoethanolamine, ethylethanolamine, diethylethanolamine, diethanolamine, and triethanolamine, and the like. Examples of the alkali metal hydroxide include sodium hydroxide, potassium hydroxide, and the like.

When the water-soluble resin is compounded, a content of the water-soluble resin is not particularly limited. By way of an example, the content of the water-soluble resin is preferably 1.0% by mass or more, and more preferably 3.0% by mass or more, in the ink composition. Moreover, the content of the water-soluble resin is preferably 10.0% by mass or less, and more preferably 6.0% by mass or less, in the ink composition.

Surfactant

The surfactant is not particularly limited. By way of an example, examples of the surfactant include an acetylene-based surfactant, a silicone-based surfactant, and the like.

Examples of the acetylene-based surfactant include, as commercially available products, "DYNOL 607", "DYNOL 609", "OLFINE E-1004", "OLFINE E-1010", "OLFINE E-1020", "OLFINE PD-001", "OLFINE PD-002W", "OLFINE PD-004", "OLFINE PD-005", "OLFINE EXP.4001", "OLFINE EXP.4200", "OLFINE EXP.4123", "OLFINE EXP.4300" (manufactured by Nissin Chemical Industry Co., Ltd.); "SURFYNOL 104E", "SURFYNOL 104H". "SURFYNOL 104A", "SURFYNOL 104BC", "SURFYNOL 104DPM", "SURFYNOL 104PA", "SURFYNOL 104PG-50", "SURFYNOL 420", "SURFYNOL 440", "SURFYNOL 465" (manufactured by Evonik Industries AG); and the like.

Examples of the silicone-based surfactant include, as commercially available products, "BYK-307", "BYK-333", "BYK-347", "BYK-348", "BYK-349", "BYK-345", "BYK-378", "BYK-3455" (manufactured by BYK-Chemie), and the like.

When the surfactant is compounded, a content of the surfactant is not particularly limited. By way of an example, the content of the surfactant is preferably 0.1% by mass or more, and more preferably 0.3% by mass or more, in the ink composition. Moreover, the content of the surfactant is preferably 10.0% by mass or less, and more preferably 6.0% by mass or less, in the ink composition.

Water-Soluble Organic Solvent

The water-soluble organic solvent is not particularly limited. By way of an example, examples of the water-soluble organic solvent include methanol, ethanol, propanol, butanol, hexanol, ethylene glycol, ethylene glycol monomethyl ether, ethylene glycol monoethyl ether, ethylene glycol monopropyl ether, ethylene glycol monobutyl ether, ethylene glycol monooctyl ether, diethylene glycol, diethylene glycol monoethyl ether, diethylene glycol monopropyl ether, diethylene glycol monobutyl ether, triethylene glycol, triethylene glycol monomethyl ether, triethylene glycol monoethyl ether, triethylene glycol monopropyl ether, triethylene glycol monobutyl ether, propylene glycol, propylene glycol monoethyl ether, propylene glycol monopropyl ether, propylene glycol monobutyl ether, dipropylene glycol, dipropylene glycol monomethyl ether, dipropylene glycol monoethyl ether, dipropylene glycol monopropyl ether, dipropylene glycol monobutyl ether, tripropylene glycol, tripropylene glycol monomethyl ether, tripropylene glycol monoethyl ether, tripropylene glycol monopropyl ether, tripropylene glycol monobutyl ether, dibutyl glycol, glycerin, and the like.

When the water-soluble organic solvent is compounded, a content of the water-soluble organic solvent is not particularly limited. By way of an example, the content of the water-soluble organic solvent is preferably 5% by mass or more, and more preferably 10% by mass or more, in the ink composition. Moreover, the content of the surfactant is preferably 50% by mass or less, and more preferably 40% by mass or less, in the ink composition.

(Method of Producing Ink Composition)

A method of producing the ink composition of the present embodiment is not particularly limited. By way of an example, the ink composition may be prepared by a method of stirring and mixing a pigment, a water-insoluble resin, wax, and various optional components, and then kneading the mixture utilizing a variety of kneaders such as, for example, a bead mill, a ball mill, a sand mill, an attritor, a roll mill, and a pearl mill.

Referring back to the description of the ink set as a whole, the ink set of the present embodiment includes the primer composition and the ink composition described above. As a result, a surface-printed matter obtained using the ink set is excellent in solid uniformity, bleeding resistance, abrasion resistance, alcohol resistance, and heat resistance.

<Surface-Printed Matter and Inkjet Printing Method>

The surface-printed matter according to one embodiment of the present invention is a surface-printed matter to which the above-described primer composition for surface-printed flexible packaging and the above-described aqueous inkjet ink composition are applied. Moreover, the inkjet printing method according to one embodiment of the present invention includes a printing step of surface-printing the above-described primer composition for surface-printed flexible packaging and the above-described aqueous inkjet ink composition on a base material.

The base material is not particularly limited. By way of an example, the base material is a plastic film for various flexible packaging, or the like. Examples of the plastic films include oriented and non-oriented polyolefins such as polyethylene and polypropylene, polyester, nylon, cellophane, vinylon, and the like, in terms that they can be printed integrally with packaging materials.

The plastic film is preferably uniaxially or biaxially oriented from the viewpoint of imparting transparency, heat resistance, mechanical strength, etc. Moreover, the plastic film is preferably subjected to plasma treatment, corona discharge treatment, or the like on its surface to be applied with the primer composition in order to increase adhesiveness and wettability with the primer composition.

The printing step is a step of sequentially applying the primer composition and the ink composition described above to the base material by, for example, gravure printing or the like.

Specifically, the primer composition is applied to the base material to form a primer layer. By forming the primer layer, printability of the ink composition is improved, and adhesiveness of the printed layer obtained may be improved.

Next, the ink composition is printed on the above-described primer layer by an inkjet method. By printing the ink composition by the inkjet method, a printed layer is formed.

Besides, for the printing by the inkjet method, a single-pass printing method using a fixed line head is appropriate from the viewpoint of enabling a faster printing.

An amount of the ink composition to be applied is preferably 0.05 to 3.00 $g/m^2$, and more preferably 0.1 to 2.00 $g/m^2$, in terms of a solid content contained in the ink composition, from the viewpoint of a balance between a printing speed and a color density of a printed matter to be obtained.

The obtained printed matter may be appropriately subjected to a drying step using various drying devices. Moreover, the obtained printed matter may be subjected to various laminating processes.

As described above, the surface-printed matter obtained in the present embodiment is excellent in solid uniformity, bleeding resistance, abrasion resistance, alcohol resistance, and heat resistance.

One embodiment of the present invention has been described above. The present invention is not particularly limited to the above-described embodiment. Besides, the above-described embodiment mainly describes an invention having the following configurations.

(1) A primer composition for surface-printed flexible packaging comprising an acryl-based resin emulsion emulsified with a polymer, N-oleoyl sarcosine, a hydrazine-based compound having at least two or more hydrazine residues in a molecule, and wax, wherein a content of the acryl-based resin emulsion is 3 to 40% by mass in terms of solid content, and wherein a glass transition temperature of the acryl-based resin emulsion is −40 to 30° C.

According to such a configuration, the primer composition for surface-printed flexible packaging may impart excellent solid uniformity, bleeding resistance, abrasion resistance, alcohol resistance, and heat resistance to the coating film when an inkjet image is formed after applying the primer composition.

(2) The primer composition for surface-printed flexible packaging of (1), further comprising a white pigment.

According to such a configuration, the printed matter using the primer composition for surface-printed flexible packaging is further excellent in design and visibility.

(3) The primer composition for surface-printed flexible packaging of (1) or (2), further comprising a chlorinated polyolefin.

According to such a configuration, the primer composition for surface-printed flexible packaging is further excellent in solid uniformity in a coating film on which an inkjet image is formed.

(4) An ink set including the primer composition for surface-printed flexible packaging of any one of (1) to (3) and an aqueous inkjet ink composition, wherein the aqueous inkjet ink composition comprises a pigment, a water-insoluble resin, and wax.

According to such a configuration, a surface-printed matter obtained using the ink set shows an excellent solid uniformity, bleeding resistance, abrasion resistance, alcohol resistance, and heat resistance of a coating film on which an inkjet image is formed.

(5) A surface-printed matter to which the primer composition for surface-printed flexible packaging and the aqueous inkjet ink composition of (4) are applied.

According to such a configuration, a surface-printed matter obtained shows an excellent solid uniformity, bleeding resistance, abrasion resistance, alcohol resistance, and heat resistance of a coating film on which an inkjet image is formed.

(6) An inkjet printing method including a printing step of surface-printing the primer composition for surface-printed flexible packaging and the aqueous inkjet ink composition of (4) on a base material.

According to such a configuration, a surface-printed matter can be obtained which is excellent in solid uniformity, bleeding resistance, abrasion resistance, alcohol resistance, and heat resistance of a coating film on which an inkjet image is formed.

EXAMPLE

Hereinafter, the present invention will be described in more detail with reference to Examples. The present invention is not limited to these Examples. Besides, unless otherwise specified, "%" means "% by mass", and "part" means "part by mass".

Raw materials used and a preparation method are shown below.

<Aqueous Resin Varnish>

20 parts by mass of an acrylic acid/n-butyl acrylate/benzyl methacrylate/styrene copolymer having a glass transition temperature at 40° C., a weight-average molecular weight of 30,000, and an acid value of 185 mgKOH/g was dissolved in a mixed solution of 2.5 parts by mass of potassium hydroxide and 77.5 parts by mass of water to obtain an aqueous resin varnish having a solid content of 20%.

<Preparation of Aqueous Black Ink Base A>

60.3 parts by mass of water was added to 23.7 parts by mass of the aqueous resin varnish and mixed to prepare a resin varnish for pigment dispersion. To this varnish, 16 parts by mass of carbon black (Printex 90, manufactured by Orion Engineered Carbons S.A.) was further added, stirred and mixed, and then the mixture was kneaded with a wet type circulation mill to prepare an aqueous black ink base.

<Preparation of Aqueous Black Ink Base B (Cross-Linked Base)>

2.1 parts by mass of Epolite 1600 (bifunctional epoxy compound, manufactured by Kyoeisha Chemical Co., Ltd.) and 22.9 parts by mass of water were added to 75 parts by mass of the aqueous black ink base A described above and heated at 60° C. for 24 hours to obtain an aqueous black ink base B.

<Preparation of Aqueous Yellow Ink Base>

64.3 parts by mass of water was added to 23.7 parts by mass of the aqueous resin varnish and mixed to prepare a resin varnish for pigment dispersion. To this varnish, 12 parts by mass of a yellow pigment (Novoperm Yellow 4G01, manufactured by CLARIANT) was further added, stirred and mixed, and then the mixture was kneaded with a wet type circulation mill to prepare an aqueous yellow ink base.

<Preparation of Aqueous Magenta Ink Base>

64.3 parts by mass of water was added to 23.7 parts by mass of the aqueous resin varnish and mixed to prepare a resin varnish for pigment dispersion. To this varnish, 12 parts by mass of a magenta pigment (Inkjet Magenta E5B02, manufactured by CLARIANT) was further added, stirred and mixed, and then the mixture was kneaded with a wet type circulation mill to prepare an aqueous magenta ink base.

<Preparation of Aqueous Cyan Ink Base>

64.3 parts by mass of water was added to 23.7 parts by mass of the aqueous resin varnish and mixed to prepare a resin varnish for pigment dispersion. To this varnish, 12 parts by mass of a cyan pigment (Heliogen Blue L7101F, manufactured by BASF) was further added, stirred and mixed, and then the mixture was kneaded with a wet type circulation mill to prepare an aqueous cyan ink base.

<Preparation of Aqueous White Pigment Base>

20.0 parts by mass of water was added to 40.0 parts by mass of the aqueous resin varnish and mixed to prepare a resin varnish for pigment dispersion. To this varnish, 40 parts by mass of titanium oxide (R-960, manufactured by DuPont) was further added, stirred and mixed, and then the mixture was kneaded with a wet type circulation mill to prepare an aqueous white pigment base.

<Surfactant>

OLFINE E1010 (solid content: 100%, HLB: 13-14, manufactured by Nissin Chemical Industry Co., Ltd.)

OLFINE E1004 (solid content: 100%, HLB 7-9, manufactured by Nissin Chemical Industry Co., Ltd.)

<Resin Emulsion>

(Acryl-Based Resin Emulsion Emulsified with Polymer)

PE-1126 (solid content: 41.5%, acrylic resin emulsion emulsified with a polymer, manufactured by SEIKO PMC CORPORATION, Tg: −12° C.)

JE-1113 (solid content: 42.5%, acrylic resin emulsion emulsified with a polymer, manufactured by SEIKO PMC CORPORATION, Tg: −24° C.)

HE-1335 (solid content: 45.5%, acryl-styrene resin emulsion emulsified with a polymer, manufactured by SEIKO PMC CORPORATION, Tg: 15° C.)

QE-1042 (solid content: 40.5%, acryl-styrene resin emulsion emulsified with a polymer, manufactured by SEIKO PMC CORPORATION, Tg: 53° C.)

(Acryl-Based Resin Emulsion Emulsified with Emulsifier)

Mowinyl 7320 (solid content: 40.0%, acrylic resin emulsion emulsified with an emulsifier, manufactured by Japan Coating Resin co., ltd., Tg: −20° C.)

Mowinyl 730L (solid content: 46.0%, acrylic resin emulsion emulsified with an emulsifier, manufactured by Japan Coating Resin co., ltd., Tg:−13° C.)

Neo-Cryl A-1125 (solid content: 19.5%, acrylic resin emulsion emulsified with an emulsifier, manufactured by DSM NeoResins, Tg: 13° C.)

Neo-Cryl A-1093 (solid content: 45.5%, acryl-styrene resin emulsion emulsified with an emulsifier, manufactured by DSM NeoResins, Tg: 17° C.)

15

<Polyvinyl-Based Resin>

Neo-Cryl A-1094 (solid content: 45.5%, acryl-styrene resin emulsion, manufactured by DSM NeoResins)

Neo-Cryl A-1125 (solid content: 19.5%, acrylic resin emulsion, manufactured by DSM NeoResins)

Vinyblan 715S (solid content: 23%, vinyl chloride resin emulsion, manufactured by Nissin Chemical Industry Co., Ltd.)

AUROREN AE-301 (solid content: 30%, polyolefin resin emulsion, manufactured by Nippon Paper Industries Co., Ltd.)

JONCRYL JDX-6639 (solid content: 29%, acryl-styrene resin aqueous solution, manufactured by BASF)

3401MA (solid content: 40%, acrylic resin aqueous solution, manufactured by Taisei Fine Chemical Co., Ltd.)

<Polyurethane-Based Resin>

SUPERFLEX 150HS (solid content: 38%, polyurethane resin emulsion, manufactured by DKS Co. Ltd.)

HYDRAN HW350 (solid content: 30%, polyester polyurethane resin aqueous solution, manufactured by DIC Corporation)

<Polyester-Based Resin> elitel KT-9204 (solid content: 30%, polyester resin emulsion, manufactured by UNITIKA LTD.)

PLAS COAT Z-730 (solid content: 25%, polyester resin aqueous solution, manufactured by GOO Chemical Co., Ltd.)

16

<Wax Emulsion>

AQUACER 531 (solid content: 45%, polyethylene resin emulsion, average particle size: 160 nm, manufactured by BYK Japan KK)

AQUACER 539 (solid content: 35%, polyethylene wax emulsion, average particle size: 50 nm, manufactured by BYK Japan KK)

CHEMIPEARL W-400 (solid content: 40%, polyethylene resin emulsion, average particle size: 4.0 μm, manufactured by Mitsui Chemicals, Inc.)

Example 1

Each material was mixed and stirred according to a mass ratio (% by mass) shown in Table 1 below to prepare a primer composition (P1). Storage stability of the obtained primer composition was evaluated by the following evaluation method. The results are shown in Table 1. Moreover, each material was kneaded in a paint conditioner according to a mass ratio (% by mass) shown in Table 2 below to prepare an ink composition (K1). Using an ink set consisting of the primer composition (P1) and the ink composition (K1), gravure printing was performed under the following condition to obtain a printed matter. Solid formation, bleeding of thin line (bleeding resistance), abrasion resistance, alcohol resistance, and heat resistance of the obtained printed matter were evaluated according to the following evaluation methods. The results are shown in Tables 4 and 5.

TABLE 1

| | | | | P1 | P2 | P3 | P4 | P5 | P6 | P7 | P8 | P9 | P10 |
|---|---|---|---|---|---|---|---|---|---|---|---|---|---|
| Aqueous white pigment base | | | | 23.3 | — | 23.3 | 23.3 | 23.3 | 23.3 | 23.3 | 23.3 | 23.3 | 23.3 |
| Resin emulsion (solid content) | Acryl (Tg −12° C.) | Emulsified with polymer | PE-1126 | 20.0 | 20.0 | 5.0 | 30.0 | 20.0 | 20.0 | 20.0 | 20.0 | 20.0 | 20.0 |
| | Acryl (Tg −24° C.) | Emulsified with polymer | JE-1113 | — | — | — | — | — | — | — | — | — | — |
| | Acryl-styrene (Tg 15° C.) | Emulsified with polymer | HE-1335 | — | — | — | — | — | — | — | — | — | — |
| | Acryl-styrene (Tg 53° C.) | Emulsified with polymer | QE-1042 | — | — | — | — | — | — | — | — | — | — |
| | Acryl (Tg −20° C.) | Emulsified with emulsifier | Mowinyl 7320 | — | — | — | — | — | — | — | — | — | — |
| | Acryl (Tg −13° C.) | Emulsified with emulsifier | Mowinyl 730L | — | — | — | — | — | — | — | — | — | — |
| | Acryl (Tg 13° C.) | Emulsified with emulsifier | Neo-Cryl A-1125 | — | — | — | — | — | — | — | — | — | — |
| | Acryl-styrene (Tg 17° C.) | Emulsified with emulsifier | Neo-Cryl A-1093 | — | — | — | — | — | — | — | — | — | — |
| Chlorinated polyolefin emulsion (solid content) | SUPERCHLON E480T | | | 2.0 | 2.0 | 2.0 | 2.0 | 2.0 | 2.0 | 2.0 | 2.0 | — | 5.0 |
| Hydrazide compound | Adipic acid dihydrazide | | | 1.0 | 1.0 | 1.0 | 1.0 | 1.0 | 1.0 | 1.0 | 1.0 | 1.0 | 1.0 |
| N-oleoyl sarcosine | | | | 0.9 | 0.9 | 0.9 | 0.9 | 0.9 | 0.9 | 0.9 | 0.9 | 0.9 | 0.9 |
| Wax emulsion (solid content) | Polyethylene wax (particle size: 160 nm) | AQUACER531 | | — | — | — | — | — | — | — | — | — | — |
| | Polyethylene wax (particle size: 4 μm) | CHEMIPEARL W-400 | | 2.0 | 2.0 | 2.0 | 2.0 | 2.0 | 2.0 | 2.0 | 2.0 | 2.0 | 2.0 |
| Water-soluble organic | Dipropylene glycol dimethyl ether | | | — | — | — | — | 5.0 | — | — | — | — | — |
| | Tripropylene glycol monobutyl ether | | | — | — | — | — | — | 0.5 | — | — | — | — |
| | 3-methoxy-3-methyl-1-butanol | | | — | — | — | — | — | — | 5.0 | — | — | — |

TABLE 1-continued

| | | | | | | | | | | | | |
|---|---|---|---|---|---|---|---|---|---|---|---|---|
| solvent | Isopropanol | | | — | — | — | — | — | — | — | 10.0 | — | — |
| Water | | | | 50.8 | 74.1 | 65.8 | 40.8 | 45.8 | 50.3 | 45.8 | 40.8 | 52.8 | 47.8 |
| | | | | | | | | | | | | | |
| Total | | | | 100.0 | 100.0 | 100.0 | 100.0 | 100.0 | 100.0 | 100.0 | 100.0 | 100.0 | 100.0 |
| Storage stability | | | | ○ | ○ | ○ | Δ | ○ | ○ | ○ | ○ | ○ | Δ |

| | | | | P11 | P12 | P13 | P14 | P15 | P16 | P17 | P18 | P19 |
|---|---|---|---|---|---|---|---|---|---|---|---|---|
| Aqueous white pigment base | | | | 23.3 | 23.3 | 23.3 | 23.3 | 23.3 | 23.3 | 23.3 | 23.3 | 23.3 |
| Resin emulsion (solid content) | Acryl (Tg −12° C.) | Emulsified with polymer | PE-1126 | 20.0 | 20.0 | 20.0 | 20.0 | 20.0 | 20.0 | 20.0 | — | — |
| | Acryl (Tg −24° C.) | Emulsified with polymer | JE-1113 | — | — | — | — | — | — | — | 20.0 | — |
| | Acryl-styrene (Tg 15° C.) | Emulsified with polymer | HE-1335 | — | — | — | — | — | — | — | — | 20.0 |
| | Acryl-styrene (Tg 53° C.) | Emulsified with polymer | QE-1042 | — | — | — | — | — | — | — | — | — |
| | Acryl (Tg −20° C.) | Emulsified with emulsifier | Mowinyl 7320 | — | — | — | — | — | — | — | — | — |
| | Acryl (Tg −13° C.) | Emulsified with emulsifier | Mowinyl 730L | — | — | — | — | — | — | — | — | — |
| | Acryl (Tg 13° C.) | Emulsified with emulsifier | Neo-Cryl A-1125 | — | — | — | — | — | — | — | — | — |
| | Acryl-styrene (Tg 17° C.) | Emulsified with emulsifier | Neo-Cryl A-1093 | — | — | — | — | — | — | — | — | — |
| Chlorinated polyolefin emulsion (solid content) | SUPERCHLON E480T | | | 2.0 | 2.0 | 2.0 | 2.0 | 2.0 | 2.0 | 2.0 | 2.0 | 2.0 |
| Hydrazide compound | Adipic acid dihydrazide | | | 0.1 | 5.0 | 1.0 | 1.0 | 1.0 | 1.0 | 1.0 | 1.0 | 1.0 |
| N-oleoyl sarcosine | | | | 0.9 | 0.9 | 0.1 | 5.0 | 0.9 | 0.9 | 0.9 | 0.9 | 0.9 |
| Wax emulsion (solid content) | Polyethylene wax (particle size: 160 nm) | AQUACER531 | | — | — | — | — | 2.0 | — | — | — | — |
| | Polyethylene wax (particle size: 4 μm) | CHEMIPEARL W-400 | | 2.0 | 2.0 | 2.0 | 2.0 | — | 0.1 | 10.0 | 2.0 | 2.0 |
| Water-soluble organic solvent | Dipropylene glycol dimethyl ether | | | — | — | — | — | — | — | — | — | — |
| | Tripropylene glycol monobutyl ether | | | — | — | — | — | — | — | — | — | — |
| | 3-methoxy-3-methyl-1-butanol | | | — | — | — | — | — | — | — | — | — |
| | Isopropanol | | | — | — | — | — | — | — | — | — | — |
| Water | | | | 51.7 | 46.8 | 51.6 | 46.7 | 50.8 | 52.7 | 42.8 | 50.8 | 50.8 |
| | | | | | | | | | | | | |
| Total | | | | 100.0 | 100.0 | 100.0 | 100.0 | 100.0 | 100.0 | 100.0 | 100.0 | 100.0 |
| Storage stability | | | | ○ | Δ | ○ | Δ | ○ | ○ | Δ | ○ | ○ |

TABLE 2

| | | | | P20 | P21 | P22 | P23 | P24 | P25 | P26 | P27 | P28 | P29 |
|---|---|---|---|---|---|---|---|---|---|---|---|---|---|
| Aqueous white pigment base | | | | 23.3 | 23.3 | 23.3 | 23.3 | 23.3 | 23.3 | 23.3 | 23.3 | 23.3 | 23.3 |
| Resin emulsion (solid content) | Acryl (Tg −12° C.) | Emulsified with polymer | PE-1126 | — | 1.0 | 20.0 | 20.0 | 20.0 | — | — | — | — | — |
| | Acryl (Tg −24° C.) | Emulsified with polymer | JE-1113 | — | — | — | — | — | — | — | — | — | — |
| | Acryl-styrene (Tg 15° C.) | Emulsified with polymer | HE-1335 | — | — | — | — | — | — | — | — | — | — |
| | Acryl-styrene (Tg 53° C.) | Emulsified with polymer | QE-1042 | — | — | — | — | — | 20.0 | — | — | — | — |
| | Acryl (Tg −20° C.) | Emulsified with emulsifier | Mowinyl 7320 | — | — | — | — | — | — | 20.0 | — | — | — |
| | Acryl (Tg −13° C.) | Emulsified with emulsifier | Mowinyl 730L | — | — | — | — | — | — | — | 20.0 | — | — |
| | Acryl (Tg 13° C.) | Emulsified with emulsifier | Neo-Cryl A-1125 | — | — | — | — | — | — | — | — | 20.0 | — |
| | Acryl-styrene (Tg 17° C.) | Emulsified with emulsifier | Neo-Cryl A-1093 | — | — | — | — | — | — | — | — | — | 20.0 |

TABLE 2-continued

| | | P20 | P21 | P22 | P23 | P24 | P25 | P26 | P27 | P28 | P29 |
|---|---|---|---|---|---|---|---|---|---|---|---|
| Chlorinated polyolefin emulsion (solid content) | SUPERCHLON E480T | 2.0 | 2.0 | 2.0 | 2.0 | 2.0 | 2.0 | 2.0 | 2.0 | 2.0 | 2.0 |
| Hydrazide compound | Adipic acid dihydrazide | 1.0 | 1.0 | — | 1.0 | 1.0 | 1.0 | 1.0 | 1.0 | 1.0 | 1.0 |
| N-oleoyl sarcosine | | 0.9 | 0.9 | 0.9 | — | 0.9 | 0.9 | 0.9 | 0.9 | 0.9 | 0.9 |
| Wax emulsion (solid content) | Polyethylene wax AQUACER531 (particle size: 160 nm) | — | — | — | — | — | — | — | — | — | — |
| | Polyethylene wax CHEMIPEARL W-400 (particle size: 4 μm) | 2.0 | 2.0 | 2.0 | 2.0 | — | 2.0 | 2.0 | 2.0 | 2.0 | 2.0 |
| Water- soluble organic solvent | Dipropylene glycol dimethyl ether | — | — | — | — | — | — | — | — | — | — |
| | Tripropylene glycol monobutyl ether | — | — | — | — | — | — | — | — | — | — |
| | 3-methoxy-3-methyl-1-butanol | — | — | — | — | — | — | — | — | — | — |
| | Isopropanol | — | — | — | — | — | — | — | — | — | — |
| Water | | 70.8 | 69.8 | 51.8 | 51.7 | 52.8 | 50.8 | 50.8 | 50.8 | 50.8 | 50.8 |
| Total | | 100.0 | 100.0 | 100.0 | 100.0 | 100.0 | 100.0 | 100.0 | 100.0 | 100.0 | 100.0 |
| Storage stability | | ○ | ○ | ○ | ○ | ○ | ○ | ○ | ○ | ○ | ○ |

TABLE 3

| | | | | K1 | Y1 | M1 | C1 | K2 | K3 | K4 | K5 | K6 |
|---|---|---|---|---|---|---|---|---|---|---|---|---|
| Aqueous black ink base A | | | | 37.5 | — | — | — | 37.5 | 37.5 | 37.5 | 37.5 | 37.5 |
| Aqueous black ink base B | | | | — | — | — | — | — | — | — | — | — |
| Aqueous yellow ink base | | | | — | 50.0 | — | — | — | — | — | — | — |
| Aqueous magenta ink base | | | | — | — | 50.0 | — | — | — | — | — | — |
| Aqueous cyan ink base | | | | — | — | — | 34.0 | — | — | — | — | — |
| Water- insoluble resin (solid content) | Polyvinyl resin | Acryl-styrene resin emulsion | Neo-Cryl A-1094 | 1.0 | 1.0 | 1.0 | 1.0 | — | — | — | — | — |
| | | Acrylic resin emulsion | Neo-Cryl A-1125 | — | — | — | — | 1.0 | — | — | — | — |
| | | Vinyl chloride resin emulsion | Vinyblan 715S | — | — | — | — | — | 1.0 | — | — | — |
| | | Polyolefin resin emulsion | AUROREN AE-301 | — | — | — | — | — | — | 1.0 | — | — |
| | Polyurethane resin emulsion | | SUPERFLEX 150HS | — | — | — | — | — | — | — | 1.0 | — |
| | Polyester resin emulsion | | elitel KT-9204 | — | — | — | — | — | — | — | — | 1.0 |
| Water- soluble resin (solid content) | Polyvinyl resin | Acryl-styrene resin aqueous solution | JONCRYL JDX-6639 | — | — | — | — | — | — | — | — | — |
| | | Acrylic resin aqueous solution | 3401MA | — | — | — | — | — | — | — | — | — |
| | Polyurethane resin aqueous solution | | HYDRAN HW350 | — | — | — | — | — | — | — | — | — |
| | Polyester resin aqueous solution | | PLAS COAT Z-730 | — | — | — | — | — | — | — | — | — |
| Wax emulsion (solid content) | Polyethylene wax (particle size: 160 nm) | AQUACER531 | | 1.0 | 1.0 | 1.0 | 1.0 | 1.0 | 1.0 | 1.0 | 1.0 | 1.0 |
| | Polyethylene wax (particle size: 50 nm) | AQUACER539 | | — | — | — | — | — | — | — | — | — |
| Surfactant | OLFINE E1010 | | | 0.5 | 0.5 | 0.5 | 0.5 | 0.5 | 0.5 | 0.5 | 0.5 | 0.5 |
| | OLFINE E1004 | | | 0.5 | 0.5 | 0.5 | 0.5 | 0.5 | 0.5 | 0.5 | 0.5 | 0.5 |
| Water-soluble organic solvent | Propylene glycol | | | 30.0 | 30.0 | 30.0 | 37.0 | 30.0 | 30.0 | 30.0 | 30.0 | 30.0 |
| Water | | | | 29.5 | 17.0 | 17.0 | 26.0 | 29.5 | 29.5 | 29.5 | 29.5 | 29.5 |
| Total | | | | 100.0 | 100.0 | 100.0 | 100.0 | 100.0 | 100.0 | 100.0 | 100.0 | 100.0 |

| | | | | K7 | K8 | K9 | K10 | K11 | K12 | K13 | K14 | K15 |
|---|---|---|---|---|---|---|---|---|---|---|---|---|
| Aqueous black ink base A | | | | — | 37.5 | 37.5 | 37.5 | 37.5 | 37.5 | 37.5 | 37.5 | 37.5 |
| Aqueous black ink base B | | | | 50.0 | — | — | — | — | — | — | — | — |
| Aqueous yellow ink base | | | | — | — | — | — | — | — | — | — | — |
| Aqueous magenta ink base | | | | — | — | — | — | — | — | — | — | — |
| Aqueous cyan ink base | | | | — | — | — | — | — | — | — | — | — |

TABLE 3-continued

| | | | | | | | | | | | | |
|---|---|---|---|---|---|---|---|---|---|---|---|---|
| Water-insoluble resin (solid content) | Polyvinyl resin | Acryl-styrene resin emulsion | Neo-Cryl A-1094 | 1.0 | 1.0 | 1.0 | 1.0 | 1.0 | — | — | — | — |
| | | Acrylic resin emulsion | Neo-Cryl A-1125 | — | — | — | — | — | — | — | — | — |
| | | Vinyl chloride resin emulsion | Vinyblan 715S | — | — | — | — | — | — | — | — | — |
| | | Polyolefin resin emulsion | AUROREN AE-301 | — | — | — | — | — | — | — | — | — |
| | Polyurethane resin emulsion | | SUPERFLEX 150HS | — | — | — | — | — | — | — | — | — |
| | Polyester resin emulsion | | elitel KT-9204 | — | — | — | — | — | — | — | — | — |
| Water-soluble resin (solid content) | Polyvinyl resin | Acryl-styrene resin aqueous solution | JONCRYL JDX-6639 | — | — | — | — | — | 1.0 | — | — | — |
| | | Acrylic resin aqueous solution | 3401MA | — | — | — | — | — | — | 1.0 | — | — |
| | Polyurethane resin aqueous solution | | HYDRAN HW350 | — | — | — | — | — | — | — | 1.0 | — |
| | Polyester resin aqueous solution | | PLAS COAT Z-730 | — | — | — | — | — | — | — | — | 1.0 |
| Wax emulsion (solid content) | | Polyethylene wax (particle size: 160 nm) | AQUACER531 | 1.0 | 0.1 | 3.0 | — | — | 1.0 | 1.0 | 1.0 | 1.0 |
| | | Polyethylene wax (particle size: 50 nm) | AQUACER539 | — | — | — | 1.0 | — | — | — | — | — |
| Surfactant | | OLFINE E1010 | | 0.5 | 0.5 | 0.5 | 0.5 | 0.5 | 0.5 | 0.5 | 0.5 | 0.5 |
| | | OLFINE E1004 | | 0.5 | 0.5 | 0.5 | 0.5 | 0.5 | 0.5 | 0.5 | 0.5 | 0.5 |
| Water-soluble organic solvent | | Propylene glycol | | 30.0 | 30.0 | 30.0 | 30.0 | 30.0 | 30.0 | 30.0 | 30.0 | 30.0 |
| Water | | | | 17.0 | 30.4 | 27.5 | 29.5 | 30.5 | 29.5 | 29.5 | 29.5 | 29.5 |
| Total | | | | 100.0 | 100.0 | 100.0 | 100.0 | 100.0 | 100.0 | 100.0 | 100.0 | 100.0 |

Examples 2 to 31, Comparative Examples 1 to 15

According to the descriptions in Tables 1 to 3, a printed matter was produced and evaluated by the same method as in Example 1, except that types of primer compositions used (P2 to P29), types of ink compositions (K1 to K15, Y1, M1, C1), and formulations were changed. The results are shown in Tables 4 and 5.

<Storage Stability of Primer Composition>

Each of the primer compositions was placed in a glass bottle, and a viscosity at 25° C. thereof was measured using a viscometer (RE100L type, manufactured by Toki Sangyo Co., Ltd.). Then, it was sealed and stored at 60° C. for 1 month, and a viscosity (25° C.) after storage thereof was measured with a viscometer. Storage stability was evaluated with a rate of change in viscosity (100×(60° C., viscosity after 1 month-viscosity before storage)/viscosity before storage).

(Evaluation Criteria)

○: The rate of change in viscosity was less than 5%.

Δ: The rate of change in viscosity was 5% or more and less than 10%.

x: The rate of change in viscosity was 10% or more and less than 30%.

<Condition for Creating Primer Layer>

The primer composition was printed under the following printing condition by utilizing a gravure printing machine on a treating surface of a base material and dried to form a primer layer.

(Printing Condition)

Base material: Biaxially oriented polypropylene film subjected to a corona discharge treatment, P-2111, manufactured by TOYOBO CO., LTD., thickness: 20 μm Printing equipment: Gravure printing machine Printing plate: Helio 175-line solid version Printing speed: 15 m/min Drying condition: 80° C.

<Solid Formation>

The ink composition in Table 3 was mounted on an inkjet printer, and 20 cm×11.5 cm of a solid image was printed on a surface of each primer layer as prepared above to obtain a printed matter, which was visually observed and evaluated according to the following criteria.

(Evaluation criteria)

○: No unevenness and streak were observed on the printed matter.

Δ: Slight unevenness and streak were observed on the printed matter.

x: Unevenness and streak were visually observed on the printed matter.

<Bleeding of Thin Line>

The ink composition in Table 3 was mounted on the inkjet printer, about 0.3 mm of a thin line was printed on a surface of each primer layer as prepared above, and thickening due to bleeding was visually observed and evaluated according to the following criteria.

(Evaluation Criteria)

○: No bleeding was observed, and printing was possible with the thickness as it was.

Δ: Partial thickening was observed, but double or more thickening was not observed.

x: Double or more thickening was observed as a whole.

<Abrasion Resistance>

The printed matter of the solid image was cut into a 2.5 cm×20 cm test piece, which was rubbed on its printed surface with a bleached cloth with a reciprocating load of 500 g×100 times using a Gakushin-Type Rubbing Tester (manufactured by Daiei Kagaku Seiki MFG Co., Ltd.), and abrasion resistance was evaluated from a degree of falling-off of the ink according to the following evaluation criteria.
(Evaluation Criteria)
　o: The coating film on which the solid image was formed did not peel off at all.
　Δ: The coating film on which the solid image was formed slightly peeled off.
　x: The coating film on which the solid image was formed almost peeled off.
<Alcohol Resistance>
The printed matter of the solid image was cut into a 2.5 cm×20 cm test piece, which was rubbed on its printed surface with a bleached cloth permeated with 5 drops of 70% ethanol aqueous solution using an injection needle with a reciprocating load of 200 g×10 times using a Gakushin-Type Rubbing Tester (manufactured by Daiei Kagaku Seiki MFG Co., Ltd.), and ethanol resistance was evaluated from a degree of falling-off of the ink according to the following evaluation criteria.
(Evaluation criteria)
　o: The coating film on which the solid image was formed did not peel off at all.

Δ: The coating film on which the solid image was formed slightly peeled off.
　x: The coating film on which the solid image was formed almost peeled off.
<Heat Resistance>
Using a heat seal tester equipped with a hot plate having a thermal gradient at 160 to 200° C., a printed surface and an aluminum foil were pressed at a pressure of 2.0 kg/cm$^2$ for 1 second. From the minimum temperature at which the ink on the printed surface transferred to the aluminum foil, heat resistance was evaluated according to the following evaluation criteria.
(Evaluation criteria)
　o: The minimum temperature at which the ink on the printed surface transferred to the aluminum foil was 200° C. or higher.
　Δ: The minimum temperature at which the ink on the printed surface transferred to the aluminum foil was 160° C. or higher and lower than 200° C.
　x: The minimum temperature at which the ink on the printed surface transferred to the aluminum foil was lower than 160° C.

TABLE 4

| | | Example | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Primer composition for surface-printed flexible packaging | | P1 | P2 | P3 | P4 | P5 | P6 | P7 | P8 | P9 | P10 | P11 | P12 | P13 | P14 | P15 | P16 |
| Aqueous inkjet ink composition | | K1 | K1 | K1 | K1 | K1 | K1 | K1 | K1 | K1 | K1 | K1 | K1 | K1 | K1 | K1 | K1 |
| Evaluation on IJ image quality | Solid formation | o | o | o | o | o | o | o | o | o | Δ | o | o | o | o | o | o |
| | Bleeding of thin line | o | o | o | o | o | o | o | o | o | o | Δ | o | o | o | o | o |
| Evaluation on coating film resistance | Abrasion resistance | o | o | o | o | o | o | o | o | o | o | o | o | o | o | o | Δ |
| | Alcohol resistance | o | o | Δ | o | o | o | o | o | Δ | o | Δ | o | o | o | o | Δ |
| | Heat resistance | o | o | o | o | o | o | o | o | o | o | o | o | Δ | o | o | o |

| | | Example | | | | | | | | | | | | | | |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 |
| Primer composition for surface printed flexible packaging | | P17 | P18 | P19 | P1 | P1 | P1 | P1 | P1 | P1 | P1 | P1 | P1 | P1 | P1 | P1 |
| Aqueous inkjet ink composition | | K1 | K1 | K1 | Y1 | M1 | C1 | K2 | K3 | K4 | K5 | K6 | K7 | K8 | K9 | K10 |
| Evaluation on IJ image quality | Solid formation | o | o | o | o | o | o | o | o | o | o | o | o | o | o | o |
| | Bleeding of thin line | o | o | o | o | o | o | o | o | o | o | o | o | o | o | o |
| Evaluation on coating film resistance | Abrasion resistance | o | o | o | o | o | o | o | o | o | o | o | o | o | o | o |
| | Alcohol resistance | o | o | o | o | o | o | o | o | o | o | o | o | Δ | o | Δ |
| | Heat resistance | o | o | o | o | o | o | o | o | o | o | o | o | o | o | o |

TABLE 5

| | | Comparative example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Primer composition for surface printed flexible packaging | | P20 | P21 | P22 | P23 | P24 | P25 | P26 | P27 | P28 | P29 | P1 | P1 | P1 | P1 | P1 |
| Aqueous inkjet ink composition | | K1 | K1 | K1 | K1 | K1 | K1 | K1 | K1 | K1 | K1 | K11 | K12 | K13 | K14 | K15 |
| Evaluation on IJ image quality | Solid formation | o | o | o | o | o | o | o | o | o | o | o | o | o | o | o |
| | Bleeding of thin line | o | o | o | o | o | o | o | o | o | o | o | o | o | o | o |

TABLE 5-continued

| | | Comparative example | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Evaluation on coating film resistance | Abrasion resistance | ○ | ○ | ○ | ○ | x | ○ | ○ | ○ | ○ | ○ | ○ | Δ | Δ | Δ | Δ |
| | Alcohol resistance | x | x | x | ○ | x | x | x | x | x | x | x | x | x | x | x |
| | Heat resistance | ○ | ○ | ○ | x | ○ | ○ | ○ | ○ | ○ | ○ | ○ | ○ | ○ | ○ | ○ |

The invention claimed is:

1. A primer composition for surface-printed flexible packaging, comprising an acryl- based resin emulsion emulsified with a polymer, N-oleoyl sarcosine, a hydrazine-based compound having at least two or more hydrazine residues in a molecule, and wax, wherein a content of the acryl-based resin emulsion is 3 to 40% by mass in terms of solid content, and wherein a glass transition temperature of the acryl-based resin emulsion is −40 to 30° C.

2. The primer composition for surface-printed flexible packaging of claim 1, further comprising a white pigment.

3. The primer composition for surface-printed flexible packaging of claim 1, further comprising a chlorinated polyolefin.

4. An ink set, including the primer composition for surface-printed flexible packaging of claim 1 and an aqueous inkjet ink composition, wherein the aqueous inkjet ink composition comprises a pigment, a water-insoluble resin, and wax.

5. A surface-printed matter to which the primer composition for surface-printed flexible packaging and the aqueous inkjet ink composition of claim 4 are applied.

6. An inkjet printing method, including a printing step of surface-printing the primer composition for surface-printed flexible packaging and the aqueous inkjet ink composition of claim 4 on a base material.

* * * * *